United States Patent
Yoshimi et al.

(10) Patent No.: US 9,139,063 B2
(45) Date of Patent: Sep. 22, 2015

(54) VEHICLE SUSPENSION DEVICE

(75) Inventors: Tsuyoshi Yoshimi, Susono (JP); Shingo Koumura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/379,922

(22) PCT Filed: Feb. 23, 2012

(86) PCT No.: PCT/JP2012/054461
§ 371 (c)(1),
(2), (4) Date: Aug. 20, 2014

(87) PCT Pub. No.: WO2013/125018
PCT Pub. Date: Aug. 29, 2013

(65) Prior Publication Data
US 2014/0375001 A1 Dec. 25, 2014

(51) Int. Cl.
*B60G 17/02* (2006.01)
*B60G 17/016* (2006.01)
*B60G 17/06* (2006.01)

(52) U.S. Cl.
CPC ............ *B60G 17/0164* (2013.01); *B60G 17/02* (2013.01); *B60G 17/06* (2013.01); *B60G 2204/41* (2013.01); *B60G 2400/39* (2013.01)

(58) Field of Classification Search
CPC .... B60G 17/0164; B60G 17/02; B60G 17/06; B60G 2204/41; B60G 2400/39
See application file for complete search history.

(56) References Cited

U.S. PATENT DOCUMENTS

| | | | | |
|---|---|---|---|---|
| 5,609,353 A * | 3/1997 | Watson | ....................... | 280/5.516 |
| 5,814,999 A * | 9/1998 | Elie et al. | ....................... | 324/662 |
| 5,816,587 A * | 10/1998 | Stewart et al. | ............. | 280/5.516 |
| 5,974,856 A * | 11/1999 | Elie et al. | ....................... | 73/11.04 |
| 2003/0075882 A1* | 4/2003 | Delorenzis et al. | ........ | 280/5.508 |
| 2005/0140110 A1* | 6/2005 | Lee et al. | ................ | 280/124.109 |
| 2007/0114732 A1* | 5/2007 | Dellacha | ....................... | 280/5.52 |
| 2010/0289229 A1* | 11/2010 | Post et al. | ................. | 280/5.524 |
| 2014/0284122 A1* | 9/2014 | Hirata | ........................ | 180/65.51 |

FOREIGN PATENT DOCUMENTS

| | | |
|---|---|---|
| JP | 4-154420 | 5/1992 |
| JP | 9-142121 | 6/1997 |

(Continued)

OTHER PUBLICATIONS

International Search Report issued May 29, 2012, in PCT/JP12/054461 filed Feb. 23, 2012.

*Primary Examiner* — Drew Brown
(74) *Attorney, Agent, or Firm* — Oblon, McClelland, Maier & Neustadt, L.L.P.

(57) ABSTRACT

A vehicle suspension device includes a suspension device main body configured to support a wheel of a vehicle to a vehicle body of the vehicle; a varying device configured to cause an upper connecting portion stiffness and a lower connecting portion stiffness to be variable, the upper connecting portion stiffness being a stiffness between a vertically upper portion of the suspension device main body and the vehicle body, and the lower connecting portion stiffness being a stiffness between a vertically lower portion of the suspension device main body and the vehicle body; and a control device configured to control the varying device at a time of braking of the vehicle to perform control which causes the upper connecting portion stiffness to be relatively decreased and causes the lower connecting portion stiffness to be relatively increased, compared to at a time of non-braking of the vehicle.

14 Claims, 10 Drawing Sheets

(56) References Cited

FOREIGN PATENT DOCUMENTS

| JP | 9-240235 | 9/1997 |
| JP | 2000-272317 | 10/2000 |
| JP | 2005-96587 | 4/2005 |
| JP | 2010-139012 | 6/2010 |

* cited by examiner

VEHICLE SUSPENSION DEVICE

FIELD

The present invention relates to a vehicle suspension device.

BACKGROUND

As a conventional vehicle suspension device, for example, in Patent Literature 1, a suspension stiffness control device which can adjust the stiffness of a suspension provided in a vehicle is disclosed. The suspension stiffness control device strengthens the suspension stiffness as an accelerator opening degree or a brake pedal pressing amount is increased. Accordingly, the suspension stiffness control device can secure stability to suppress compliance steering at the time of acceleration while securing turning performance to obtain compliance steering at the normal time.

CITATION LIST

Patent Literature

Patent Literature 1: Japanese Patent Application Laid-open No. 4-154420

SUMMARY

Technical Problem

However, in the suspension stiffness control device described in Patent Literature 1 as described above, for example, there is still room for improvement in terms of more appropriate reduction in vibration.

The present invention has been made taking the forgoing circumstances into consideration, and an object thereof is to provide a vehicle suspension device capable of appropriately reducing vibration.

Solution to Problem

In order to achieve the above mentioned object, a vehicle suspension device according to the present invention includes a suspension device main body configured to support a wheel of a vehicle to a vehicle body of the vehicle; a varying device configured to cause an upper connecting portion stiffness and a lower connecting portion stiffness to be variable, the upper connecting portion stiffness being a stiffness between a vertically upper portion of the suspension device main body and the vehicle body, and the lower connecting portion stiffness being a stiffness between a vertically lower portion of the suspension device main body and the vehicle body; and a control device configured to control the varying device at a time of braking of the vehicle to perform control which causes the upper connecting portion stiffness to be relatively decreased and causes the lower connecting portion stiffness to be relatively increased, compared to at a time of non-braking of the vehicle.

Further, in the vehicle suspension device, it is possible to configure that the varying device causes at least the upper connecting portion stiffness in a front-back direction of the vehicle and the lower connecting portion stiffness in the front-back direction of the vehicle to be variable.

Further, in the vehicle suspension device, it is possible to configure that the control device changes the upper connecting portion stiffness and the lower connecting portion stiffness so that a front-back force compliance of a spindle of the wheel at the time of braking of the vehicle is equal to a front-back force compliance of the spindle at the time of non-braking of the vehicle.

Further, in the vehicle suspension device, it is possible to configure that the control device prohibits the control which causes the upper connecting portion stiffness to be relatively decreased and causes the lower connecting portion stiffness to be relatively increased in a case where an absolute value of a braking force of the vehicle is equal to or greater than a predetermined value set in advance.

Further, in the vehicle suspension device, it is possible to configure that the control device continuously changes the upper connecting portion stiffness and the lower connecting portion stiffness according to a change in the braking force of the vehicle.

Further, in the vehicle suspension device, it is possible to configure that the control device causes the upper connecting portion stiffness to be relatively increased and the lower connecting portion stiffness to be relatively decreased at a time of sudden-braking at which the absolute value of the braking force of the vehicle is equal to or greater than the predetermined value set in advance, compared to at a time of smooth-braking at which the absolute value of the braking force of the vehicle is smaller than the predetermined value.

Further, in the vehicle suspension device, it is possible to configure that the control device causes the upper connecting portion stiffness to be relatively increased and causes the lower connecting portion stiffness to be relatively decreased at a time of sudden-braking at which the absolute value of the braking force of the vehicle is equal to or greater than the predetermined value set in advance, compared to at the time of non-braking of the vehicle.

Advantageous Effects of Invention

The vehicle suspension device according to the present invention exhibits an effect in which vibration can be appropriately reduced.

DESCRIPTION OF EMBODIMENTS

Hereinafter, embodiments according to the present invention will be described in detail with reference to the drawings. The present invention is not limited by the embodiments. In addition, the constituent elements in the following embodiments include elements that can be replaced or are easily replaced by those skilled in the art or substantially the same elements.

[First Embodiment]

Figure 1:
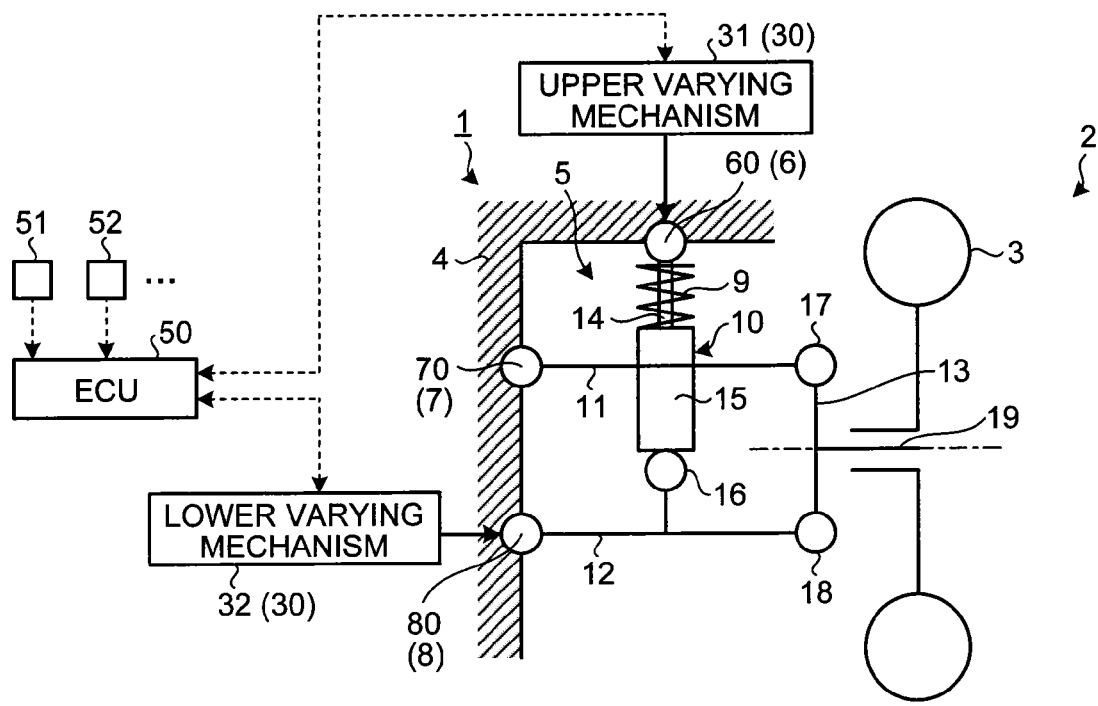
FIG. 1 is a schematic view illustrating the schematic configuration of a vehicle suspension device according to a first embodiment.
Figure 2:
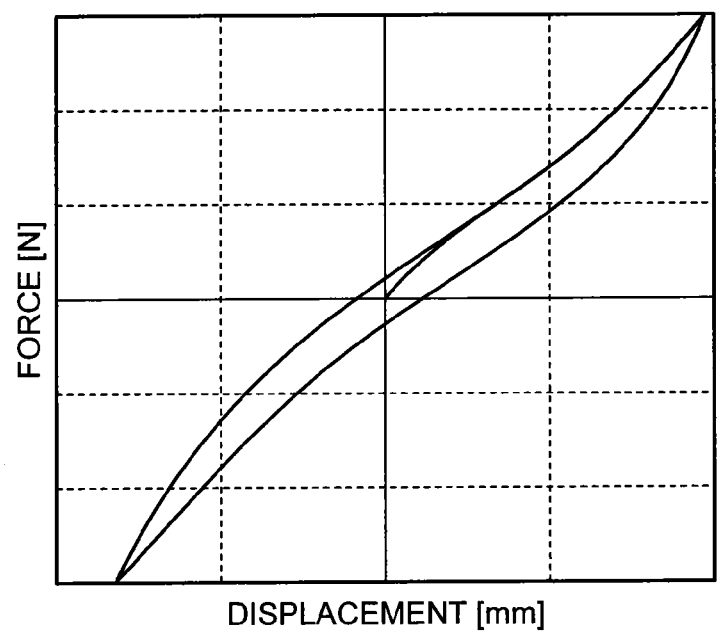
FIG. 2 is a diagram illustrating an example of the relation between displacement and force of a rubber bushing.
Figure 3:
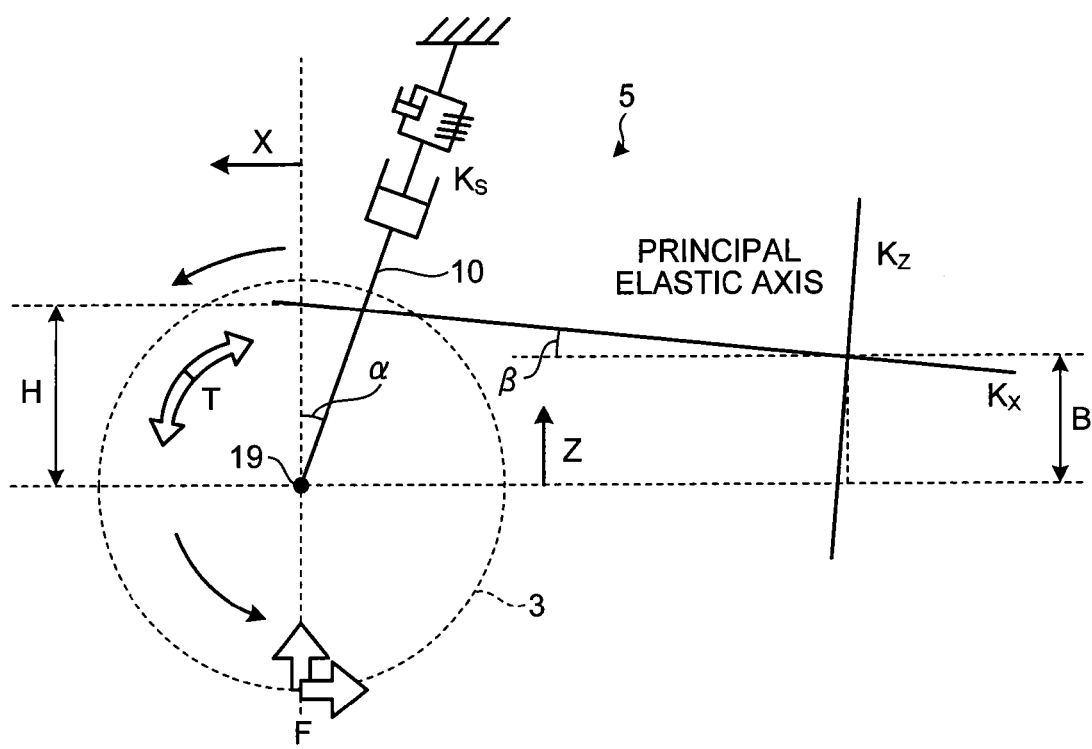
FIG. 3 is a schematic view simply illustrating a suspension in a side view.
Figure 4:
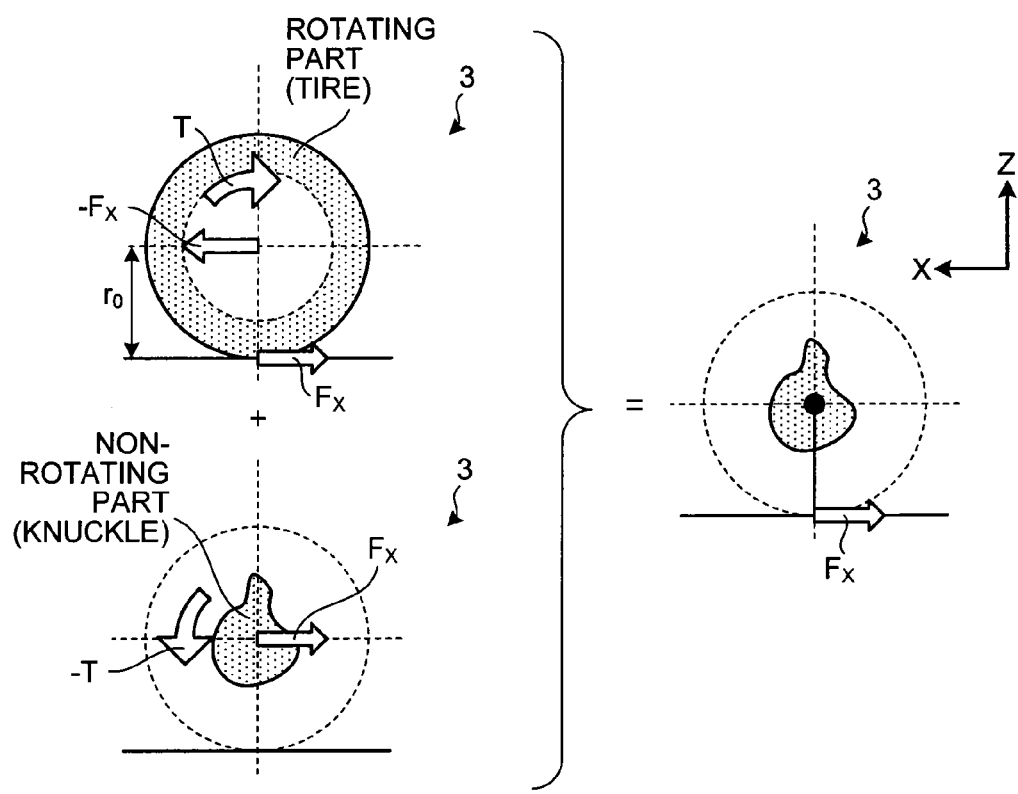
FIG. 4 is a schematic view illustrating the relation of unsprung forces of a braking torque.
Figure 5:
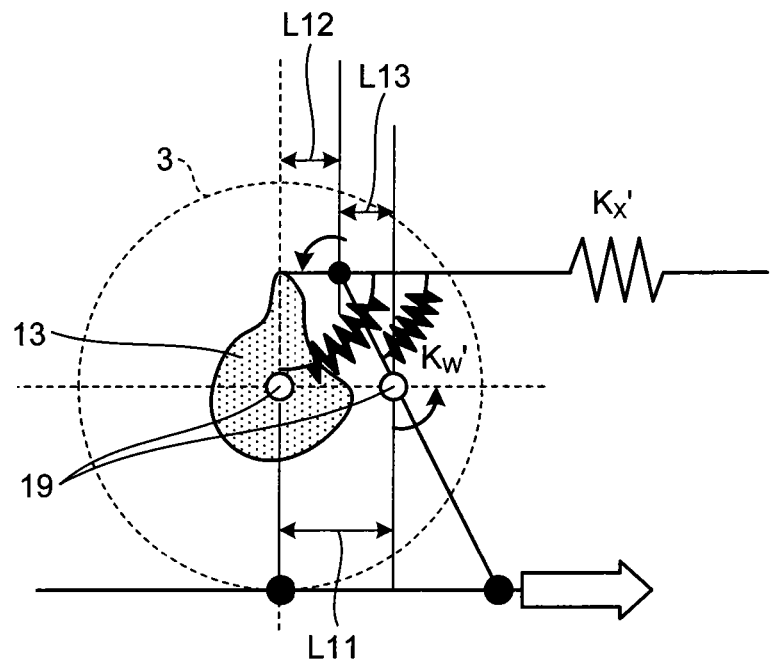
FIG. 5 is a schematic view illustrating the relation between a principal elastic axis height and a spindle front-back displacement.
Figure 6:
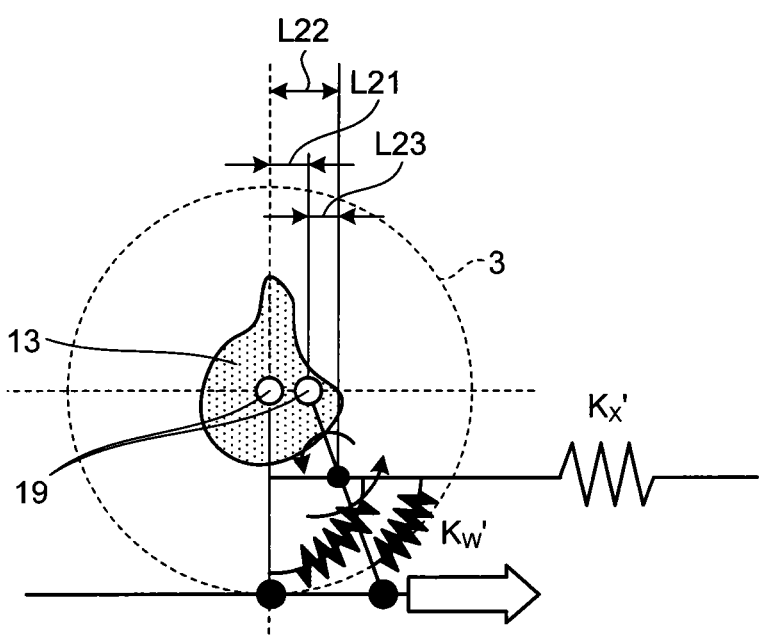
FIG. 6 is a schematic view illustrating the relation between the principal elastic axis height and the spindle front-back displacement.
Figure 7:
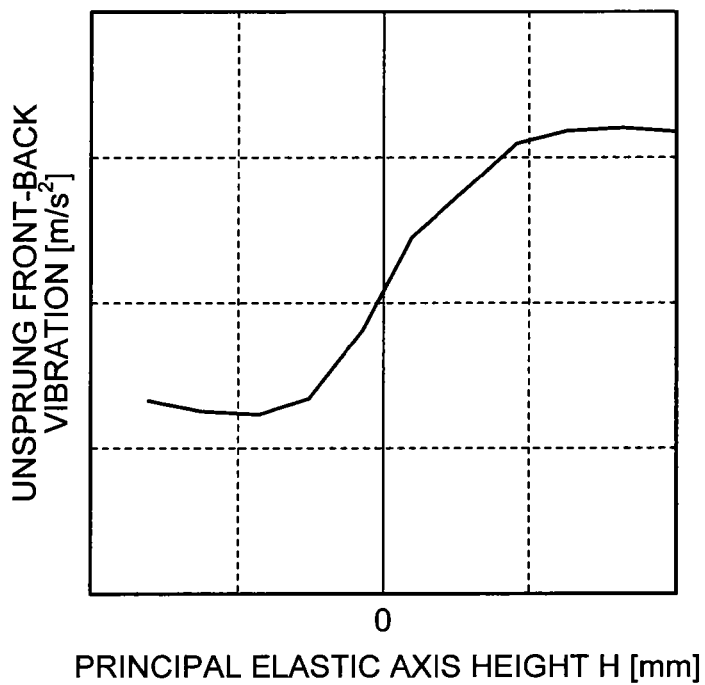
FIG. 7 is a diagram illustrating an example of the relation between the principal elastic axis height and unsprung vibration.
Figure 8:
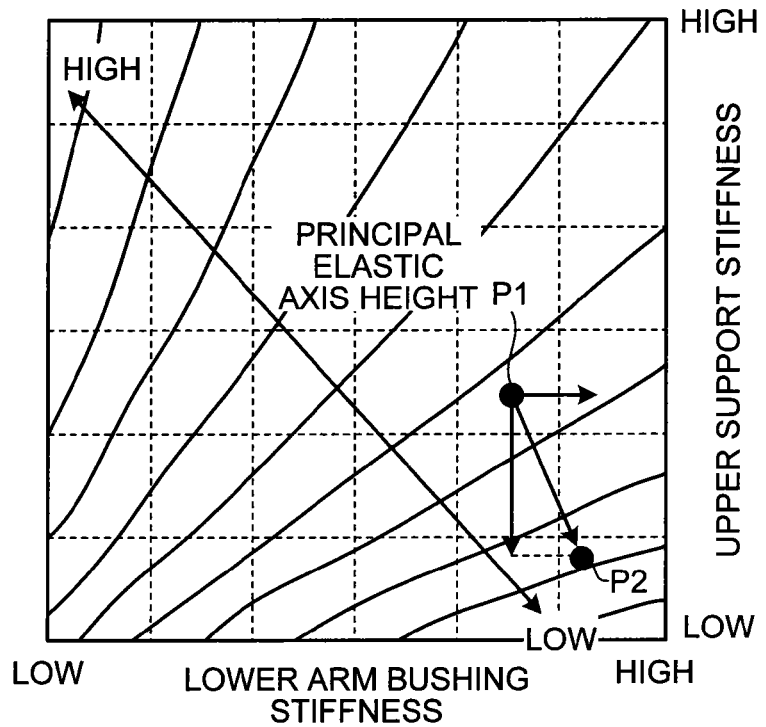
FIG. 8 is a diagram illustrating an example of the relation between a front-back stiffness of an upper support, a front-back stiffness of a lower arm bushing, and the principal elastic axis height.
Figure 9:
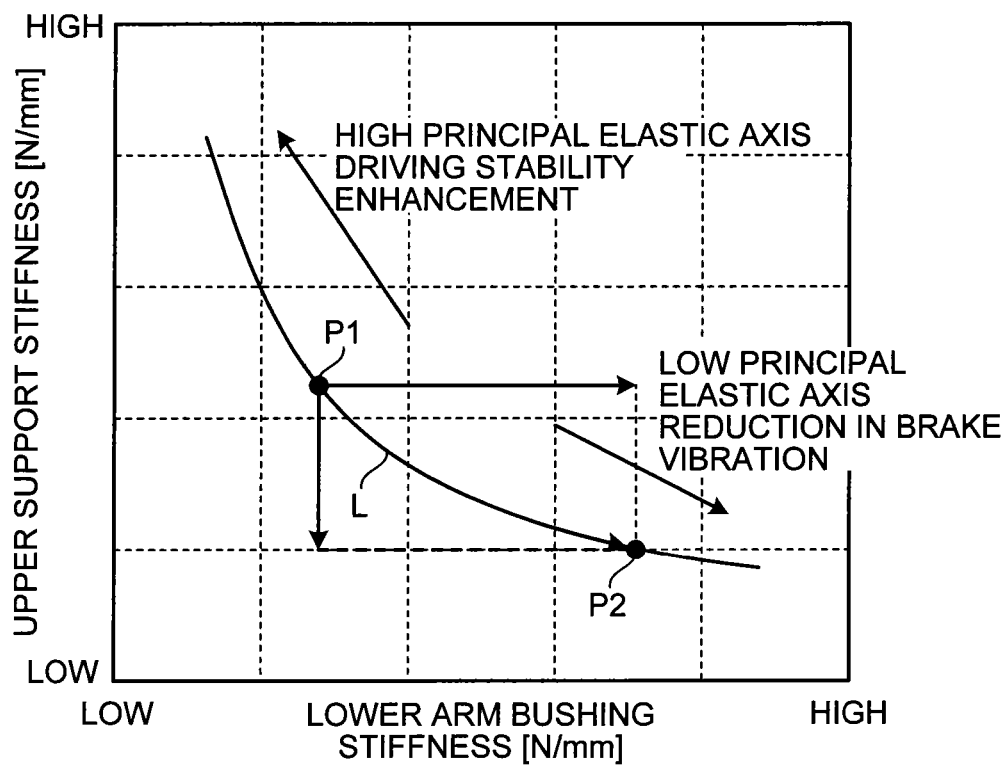
FIG. 9 is a diagram illustrating an example of a combination of the front-back stiffness in which a front-back force compliance at a spindle position is constant.
Figure 10:
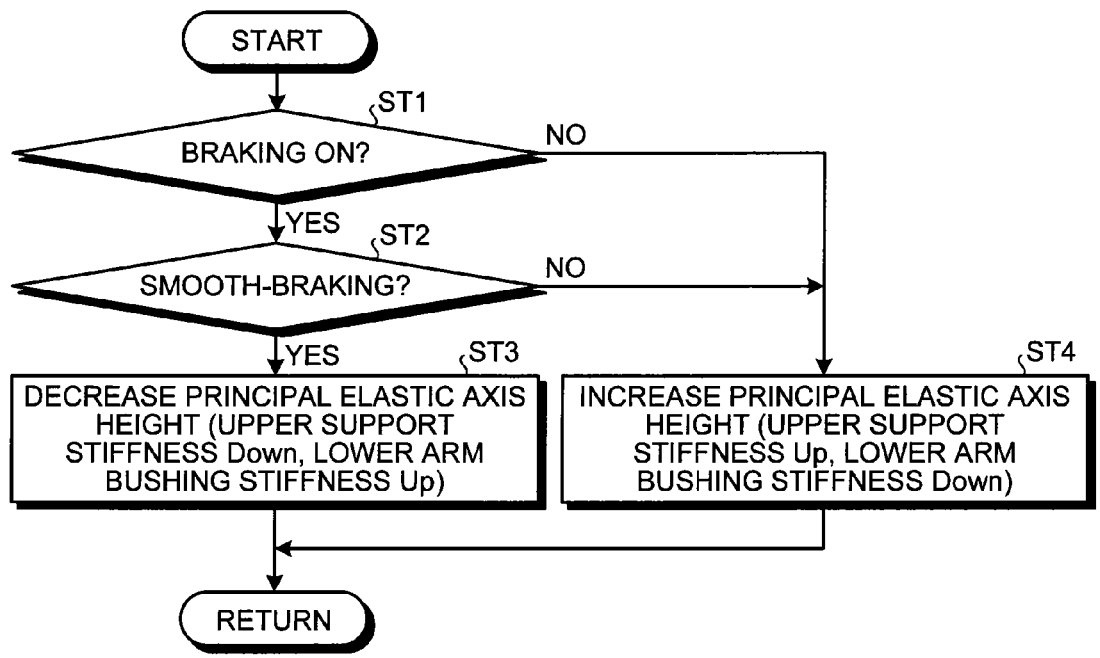
FIG. 10 is a flowchart illustrating an example of control by an ECU of the vehicle suspension device.

FIG. 1 is a schematic view illustrating the schematic configuration of a vehicle suspension device according to a first embodiment. FIG. 2 is a diagram illustrating an example of the relation between the displacement and the force of a rubber bushing. FIG. 3 is a schematic view simply illustrating a suspension in a side view. FIG. 4 is a schematic view illustrating the relation of unsprung forces of a braking torque. FIGS. 5 and 6 are schematic views illustrating the relation between a principal elastic axis height and a spindle front-back displacement. FIG. 7 is a diagram illustrating an example of the relation between the principal elastic axis height and unsprung vibration. FIG. 8 is a diagram illustrating an example of the relation between the front-back stiffness of an upper support, the front-back stiffness of a lower arm bushing, and the principal elastic axis height. FIG. 9 is a diagram illustrating an example of a combination of the front-back stiffness in which the front-back force compliance at a spindle position is constant. FIG. 10 is a flowchart illustrating an example of control by an ECU of the vehicle suspension device.

A vehicle suspension device 1 according to this embodiment is provided to correspond to each of wheels 3 of a vehicle 2 as illustrated in FIG. 1. The vehicle suspension device 1 is configured to include a suspension 5 as a suspension device main body which supports the wheels 3 of the vehicle 2 to a vehicle body 4 of the vehicle 2, and an upper connecting portion 6, an intermediate connecting portion 7, and a lower connecting portion 8, which connect the suspension 5 to the vehicle body 4. In the vehicle suspension device 1, the upper connecting portion 6, the intermediate connecting portion 7, and the lower connecting portion 8 are provided in this order from above in the vertical direction with respect to the suspension 5. In addition, the vehicle suspension device 1 of this embodiment is a vibration reducing device which reduces unsprung vibration at the time of braking due to the principal elastic axis height of the suspension 5. The vehicle suspension device 1 which is provided in each of the wheels 3 is described to be also used as a control device (ECU 50), which will be described later, but may also be provided separately without being limited to the description.

Here, the principal elastic axis of the suspension 5 is typically referred to as three virtual orthogonal axes in which, when a force is applied along a specific axial direction, the direction of the force and the direction of an elastic displacement of the force application point are coincident with each other and a plane including the force application point undergoes only linear displacement and does not cause angular displacement, in other words, the center of elastic restoration. The principal elastic axis of the suspension 5 is typically determined by the characteristics of the suspension 5, and is determined according to, for example, the strength or the arrangement of the springs of the suspension 5, the stiffness (spring constant) of the bushing of each part, and the like. In addition, unsprung vibration is typically unsprung vibration of the vehicle 2, that is, vibration that occurs on the wheels 3 side rather than the suspension 5.

Specifically, the suspension 5 is intervened between the wheels 3 and the vehicle body 4 to support the wheels 3 to the vehicle body 4 and reduces impact or vibration that is transmitted from the road surface to the vehicle body 4 via the wheels 3. The suspension 5 is configured to include a coil spring 9, a shock absorber 10, an upper arm 11, a lower arm 12, a knuckle 13, and the like and supports the wheels 3 to be steerable and rotatable relative to the vehicle body 4.

The coil spring 9 elastically supports unsprung parts to sprung parts, that is, to the vehicle body 4, to support the weight of the sprung parts of the vehicle 2, and allows vibration or impact from the road surface not to be transmitted to the vehicle body 4 through the wheels 3. The shock absorber 10 has a piston rod 14 to which the coil spring 9 is attached, and attenuates vertical vibration of the vehicle body 4 due to the coil spring 9. The shock absorber 10 is disposed along the vertical direction so that the vertically upper end portion of the piston rod 14 is connected to the vehicle body 4 via the upper connecting portion 6, and the vertically lower end portion of a cylinder 15 is connected to the lower arm 12 via a joint portion 16 such as a ball joint. The upper arm 11 and the lower arm 12 are suspension arms that support the shock absorber 10, the knuckle 13, and the like, and the upper arm 11 is disposed on the upper side in the vertical direction and the lower arm 12 is disposed on the lower side in the vertical direction. One end portion (outer end portion in the vehicle width direction) of the upper arm 11 is connected to the upper end portion of the knuckle 13 via a joint portion 17 such as a ball joint, and the other end (inner end portion in the vehicle width direction) thereof is connected to the vehicle body 4 via the intermediate connecting portion 7. One end portion (outer end portion in the vehicle width direction) of the lower arm 12 is connected to the lower end portion of the knuckle 13 via a joint portion 18 such as a ball joint, and the other end (inner end portion in the vehicle width direction) thereof is connected to the vehicle body 4 via the lower connecting portion 8. The knuckle 13 is a non-rotating part, and is a wheel support member which supports the wheels 3 to rotate about a spindle 19 as the rotation center. In addition, the knuckle 13 is provided with a caliper and the like of a braking device which generates a braking force for the vehicle 2.

The upper connecting portion 6 connects a vertically upper portion of the suspension 5 to the vehicle body 4. Here, as described above, the upper connecting portion 6 connects the piston rod 14 of the shock absorber 10 as the vertically upper portion of the suspension 5 to the vehicle body 4. The upper connecting portion 6 is configured to include an upper support 60 as an upper intervening member which is intervened between the vertically upper end portion of the piston rod 14 and the vehicle body 4. The upper connecting portion 6 connects the piston rod 14 to the vehicle body 4 via the upper support 60. The upper support 60 elastically supports the vertically upper end portion of the piston rod 14 to the vehicle body 4.

The intermediate connecting portion 7 connects a vertically intermediate portion of the suspension 5 to the vehicle body 4. Here, as described above, the intermediate connecting portion 7 connects the upper arm 11 as the vertically intermediate portion of the suspension 5 to the vehicle body 4. The intermediate connecting portion 7 is configured to include an upper arm bushing 70 as an intermediate intervening member which is intervened between one end portion (end portion on the opposite side to the knuckle 13) of the upper arm 11 and the vehicle body 4. The intermediate connecting portion 7 connects the upper arm 11 to the vehicle body 4 via the upper arm bushing 70. The upper arm bushing 70 elastically supports one end portion of the upper arm 11 to the vehicle body 4.

The lower connecting portion 8 connects a vertically lower portion of the suspension 5 to the vehicle body 4. Here, as described above, the lower connecting portion 8 connects the lower arm 12 as the vertically lower portion of the suspension 5 to the vehicle body 4. The lower connecting portion 8 is configured to include a lower arm bushing 80 as a lower intervening member which is intervened between one end portion (end portion on the opposite side to the knuckle 13) of the lower arm 12 and the vehicle body 4. The lower connecting portion 8 connects the lower arm 12 to the vehicle body 4 via the lower arm bushing 80. The lower arm bushing 80 elastically supports one end portion of the lower arm 12 to the vehicle body 4.

The upper support 60, the upper arm bushing 70, and the lower arm bushing 80 are configured to include, for example, so-called rubber bushings made of an elastomer such as rubber. The upper support 60, the upper arm bushing 70, and the lower arm bushing 80 function as so-called compliance bushings which absorb vibration and the like in the vehicle front-back direction by allowing displacement while suppressing backlash of the upper connecting portion 6, the intermediate connecting portion 7, and the lower connecting portion 8. Accordingly, the upper support 60, the upper arm bushing 70, and the lower arm bushing 80 reduce, for example, action resistance between members having different movable axes and secures driving stability and ride quality. The stiffness (spring constants) of the upper connecting portion 6, the intermediate connecting portion 7, and the lower connecting portion 8 are respectively determined according to the stiffness of the upper support 60, the upper arm bushing 70, and the lower arm bushing 80.

Here, in the vehicle suspension device 1, for example, if the stiffness of the upper support 60 is increased due to the suspension design for the purpose of mainly enhancing driving stability including straight line stability, as the counteraction, there is concern that ride quality performance may deteriorate. Focusing on the phenomenon at the time of braking of the vehicle 2, in this case, in the vehicle suspension device 1, there is concern that vibration caused by a change in the braking torque may increase, and thus there is concern that unnecessary vibration may be transmitted to a driver through steering. In addition, in the vehicle suspension device 1, for example, if the stiffness of the lower arm bushing 80 is increased to reduce a brake vibration phenomenon at the time of braking, there is concern that harshness characteristics (performance of reducing vibration in the vehicle front-back direction, so-called harshness, input via the wheels 3 in a case where the vehicle 2 climbs over projections on the road surface while traveling and the like) may deteriorate as the counteraction. Here, the rubber bushings used in the upper support 60, the lower arm bushing 80, and the like have characteristics in that the relation between the displacement and the force is non-linear as illustrated in FIG. 2. Therefore, in the vehicle suspension device 1, if the stiffness of the bushing is simply increased to reduce brake vibration at the time of braking of the vehicle 2, the stiffness in a normal use range at the time of non-braking of the vehicle 2 and the like is also increased, and thus there is concern that various counteractions as described above may occur.

Here, the vehicle suspension device 1 of this embodiment controls the upper connecting portion stiffness and the lower connecting portion stiffness between the vehicle body 4 and the suspension 5 to have a predetermined relation according to the braking state of the vehicle 2 so as to change the geometry of the suspension 5 through control, for example, when a braking torque is added, thereby reducing unsprung vibration in the vehicle front-back direction.

Specifically, the vehicle suspension device 1 includes a varying device 30 which causes the upper connecting portion stiffness and the lower connecting portion stiffness to vary, and the ECU 50 as the control device which controls the varying device 30. The upper connecting portion stiffness is the stiffness between the vertically upper portion of the suspension 5, that is, the vertically upper end portion of the piston rod 14 and the vehicle body 4, and typically, is the stiffness of the upper connecting portion 6. That is, the upper connecting portion stiffness corresponds to the stiffness of the upper support 60. On the other hand, the lower connecting portion stiffness is the stiffness between the vertically lower portion of the suspension 5, that is, the lower arm 12 and the vehicle body 4, and typically, is the stiffness of the lower connecting portion 8. That is, the lower connecting portion stiffness corresponds to the stiffness of the lower arm bushing 80.

Thus, in the vehicle suspension device 1, objects to control stiffness are the upper support 60 and the lower arm bushing 80. For example, in a case where a plurality of lower arms 12 and the like are provided in the vehicle front-back direction, the corresponding object to control stiffness is the lower arm bushing 80 of the lower arm 12 which mainly receives a load. For example, in a case where a lower arm No1 on the front side and a lower arm No2 on the rear side in the vehicle front-back direction are provided to form a pair as the lower arms 12, the object to control stiffness is the lower arm bushing 80 of the lower arm No2 which mainly receives a load.

The varying device 30 causes the upper connecting portion stiffness and the lower connecting portion stiffness to vary. The varying device 30 of this embodiment is configured to include an upper varying mechanism 31 which causes the upper connecting portion stiffness to vary by causing the stiffness of the upper support 60 to vary and a lower varying mechanism 32 which causes the lower connecting portion stiffness to vary by causing the stiffness of the lower arm bushing 80 to vary. The upper varying mechanism 31 and the lower varying mechanism 32 cause at least the upper connecting portion stiffness and the lower connecting portion stiffness in the front-back direction of the vehicle 2 to vary.

The upper varying mechanism 31 of this embodiment changes the temperature of the upper support 60 by applying a current to the upper support 60 via a variable resistor or the like to change the stiffness of the upper support 60, thereby changing the upper connecting portion stiffness. The stiffness of the upper support 60 is relatively decreased, for example, in a case where the temperature of the upper support 60 is relatively high. Here, the upper varying mechanism 31 can change the stiffness of the upper support 60, furthermore, the upper connecting portion stiffness to two levels including a relatively great value and a relatively small value. As in the upper varying mechanism 31, for example, the lower varying mechanism 32 of this embodiment changes the temperature of the lower arm bushing 80 by applying a current to the lower arm bushing 80 via a variable resistor or the like to change the stiffness of the lower arm bushing 80, thereby changing the lower connecting portion stiffness. Here, the lower varying mechanism 32 can change the stiffness of the lower arm bushing 80, furthermore, the lower connecting portion stiffness to two levels including a relatively great value and a relatively small value. In addition, the upper varying mechanism 31 and the lower varying mechanism 32 may have a configuration in which the stiffness of the upper support 60 and the lower arm bushing 80 are changed by using, for example, a magnetic fluid or the like and thus the upper connecting portion stiffness and the lower connecting portion stiffness are changed, other than the above configuration.

The ECU 50 controls the driving of each part in the vehicle 2, and is configured to include an electronic circuit having a well-known microcomputer as a main component, which includes a CPU, a ROM, a RAM, and an interface. The ECU 50 is electrically connected to various sensors and detectors which are mounted in places of the vehicle 2 such as a brake sensor 51 which detects ON/OFF of a braking operation by the driver and each of wheel speed sensors 52 which detects a wheel speed as a rotational speed of each of the wheels 3, and receives an electronic signal corresponding to the detection result. Each of the wheel speed sensors 52 is used as a sensor which detects and estimates a braking force (or deceleration) of the vehicle 2 as described later. The ECU 50 executes a stored control program on the basis of various input signals and various maps input from various sensors and outputs a drive signal to each part of the vehicle 2 including the vehicle suspension device 1, thereby controlling the driving of the parts.

The ECU 50 of this embodiment controls the upper varying mechanism 31 and the lower varying mechanism 32 of the varying device 30 according to the braking state of the vehicle 2 to control the upper connecting portion stiffness and the lower connecting portion stiffness to vary.

Specifically, the ECU 50 controls the upper varying mechanism 31 and the lower varying mechanism 32 at the time of braking of the vehicle to perform control which causes the upper connecting portion stiffness to be relatively decreased and causes the lower connecting portion stiffness to be relatively increased compared to at the time of non-braking of the vehicle 2. Here, the ECU 50 controls the upper varying mechanism 31 and the lower varying mechanism 32 at the time of smooth-braking during the braking of the vehicle 2 to perform control which causes the upper connecting portion stiffness to be relatively decreased and causes the lower connecting portion stiffness to be relatively increased compared to at the time of non-braking of the vehicle 2. On the other hand, the ECU 50 prohibits the control which causes the upper connecting portion stiffness to be relatively decreased and causes the lower connecting portion stiffness to be relatively increased at the time of sudden-braking during the braking of the vehicle 2. Accordingly, for example, the vehicle suspension device 1 achieves both driving stability (straight line stability) and reduction in brake vibration while suppressing a feeling of strangeness of the driver due to a change in harshness characteristics, thereby appropriately reducing unsprung vibration.

Here, the time of non-braking of the vehicle 2 is a state where no braking force of the vehicle 2 is generated and a state where the deceleration of the vehicle 2 is 0. On the other hand, the time of smooth-braking during the braking of the vehicle 2 is a braking state where the absolute value of the braking force of the vehicle 2 is relatively small and a state where the absolute value of the deceleration of the vehicle 2 is relatively small. Typically, the time of smooth-braking of the vehicle 2 mentioned here is a state where a braking force and a deceleration by which brake vibration occurs are applied and is determined according to, for example, the specification of the vehicle 2, the braking device, and the like. Specifically, the time of smooth-braking of the vehicle 2 is, for example, a smooth-braking range in which the deceleration of the vehicle 2 is from 0 G at the initial braking stage to about 0.3 G, more specifically, a smooth-braking range in which the deceleration causes brake vibration to be maximized, for example, is from 0 G to near 0.2 G. In addition, the time of sudden-braking during the braking of the vehicle 2 is a state where the absolute value of the braking force of the vehicle 2 is equal to or greater than a predetermined value set in advance and is a sudden-braking range in which the deceleration of the vehicle 2 is equal to or greater than a predetermined value set in advance.

As the ECU 50 controls the upper varying mechanism 31, the upper support 60 is controlled so that the front-back stiffness of the vehicle 2 is relatively decreased at the time of smooth-braking of the vehicle 2 compared to at the time of non-braking of the vehicle 2. In addition, as the above-described control is prohibited at the time of sudden-braking of the vehicle 2, in the upper support 60, the front-back stiffness of the vehicle 2 is relatively increased compared to at the time of smooth-braking of the vehicle 2. Accordingly, the upper connecting portion stiffness is relatively decreased at the time of smooth-braking of the vehicle 2 compared to at the time of non-braking of the vehicle 2, and is relatively increased at the time of sudden-braking of the vehicle 2 compared to at the time of smooth-braking of the vehicle 2. On the other hand, as the ECU 50 controls the lower varying mechanism 32, the lower arm bushing 80 is controlled so that the front-back stiffness of the vehicle 2 is relatively increased at the time of smooth-braking of the vehicle 2 compared to at the time of non-braking of the vehicle 2. In addition, as the above-described control is prohibited at the time of sudden-braking of the vehicle 2, in the lower arm bushing 80, the front-back stiffness of the vehicle 2 is relatively decreased compared to at the time of smooth-braking of the vehicle 2. Accordingly, the lower connecting portion stiffness is relatively increased at the time of smooth-braking of the vehicle 2 compared to at the time of non-braking of the vehicle 2, and is relatively decreased at the time of sudden-braking of the vehicle 2 compared to at the time of smooth-braking of the vehicle 2.

As the ECU 50 controls the upper varying mechanism 31 and the lower varying mechanism 32 as described above, the vehicle suspension device 1 allows the stiffness of the upper support 60 and the lower arm bushing 80 to vary according to the braking state of the vehicle 2. In addition, the vehicle suspension device 1 allows the upper connecting portion stiffness and the lower connecting portion stiffness to vary and thus can reduce brake vibration by using a change in the principal elastic axis height of the suspension 5 with bushing stiffness control.

FIG. 3 is a schematic view of the arrangement of the suspension 5 in a side view. In FIG. 3, "H" is the principal elastic axis height, "B" is the vehicle height, "$K_s$" is the spring characteristics of the shock absorber, "$K_Z$" is the vertical stiffness of the principal elastic axis, "$K_X$" is the front-back stiffness of the principal elastic axis, "X" is the front-back displacement of the spindle 19 (the position of unsprung center of gravity), "Z" is the vertical displacement of the spindle 19 (the position of unsprung center of gravity), "α" is the inclination of the shock absorber with respect to the vertical direction, "β" is the inclination of the principal elastic axis with respect to the horizontal direction, "T" is the torque input at the time of braking, "F" is the input from the road surface (input at the time of harshness). In addition, the height H of the principal elastic axis corresponds to a relative distance along the vertical direction from a reference point on the wheels 3 side (for example, the spindle 19) to a reference point on the principal elastic axis. The vehicle height B corresponds to a relative distance along the vertical direction from a reference point on the wheels 3 side (for example, the spindle 19) to a reference point on the vehicle body 4 side (for example, mounting bolts on the vehicle body 4 side of the lower arm bushing 80). Hereinafter, description will be provided based on the model illustrated in FIG. 3.

Although an input from the road surface is considered at the time of harshness of vehicle 2, an input of the braking torque of the braking device serves as an input source at the time of braking of the vehicle 2. The relation between unsprung forces due to the braking torque is considered, for example, as illustrated in FIG. 4 from torque inputs exerted on each of a rotating part (tire) of the wheel 3 and a non-rotating part (the knuckle 13). That is, the inputs exerted on the rotating part of the wheel 3 include a braking torque input T to the rotating part, a front-back braking force $F_X$ exerted on the ground surface between the tire of the wheel 3 and the road surface, and a reaction force $-F_X$ of the front-back braking force exerted on the ground surface. In addition, in FIG. 4, "$r_0$" is the relative distance between the spindle 19 and the ground surface along the vertical direction. The inputs exerted on the non-rotating part of the wheel 3 include a braking torque input $-T$ to the non-rotating part, and a front-back reaction force $F_X$ from the rotating part to the non-rotating part. When synthesizing the inputs, the unsprung force due to the braking torque becomes an unsprung front-back input $F_X$ at the ground surface between the tire of the wheel 3 and the road surface.

Next, unsprung vibration will be described with reference to FIGS. 5 and 6 based on the relation between the geometry of the suspension 5 and the braking torque input. As in FIGS. 5 and 6, a displacement amount of the position of the spindle 19 (hereinafter, may be referred to as a "spindle position") with respect to the vehicle front-back direction varies depending on the principal elastic axis height in a case where the same level of force (for example, the front-back input $F_X$ described above) is applied to the ground surface. In FIG. 5, the principal elastic axis height is relatively high and is positioned on the upper side in the vertical direction with respect to the spindle position in this figure. On the other hand, in FIG. 6, the principal elastic axis height is relatively low and is positioned on the lower side in the vertical direction with respect to the spindle position in this figure. In addition, in FIGS. 5 and 6, "$K_X$" is the front-back stiffness of the principal elastic axis, "$K_W$" is the wind-up stiffness (the stiffness when the knuckle 13 rotates about the spindle 19).

When the principal elastic axis height is relatively high as illustrated in FIG. 5, a displacement amount L11 of the spindle position becomes a value obtained by adding a displacement amount L12 of a translational component of the exerted force and a displacement amount L13 of a rotational component. On the other hand, when the principal elastic axis height is relatively low as illustrated in FIG. 6, a displacement amount L21 of the spindle position has a tendency to be relatively decreased as much as a displacement amount L22 of the translational component of the exerted force and a displacement amount L23 of the rotational component cancel each other. Therefore, the unsprung front-back vibration at the time of braking is reduced as the principal elastic axis height becomes lower and the displacement amount of the spindle 19 is reduced as illustrated in FIG. 7. FIG. 7 illustrates a change in the unsprung front-back vibration when the principal elastic axis height is changed by changing the characteristics of the suspension 5 and illustrates that the unsprung front-back vibration is relatively increased in a case where the principal elastic axis height is relatively high and the unsprung front-back vibration is relatively decreased in a case where the principal elastic axis height is relatively low.

The vehicle suspension device 1 of this embodiment can change the stiffness of the upper support 60 and the lower arm bushing 80 according to the braking state as the characteristics of the suspension 5 by controlling the upper varying mechanism 31 and the lower varying mechanism 32 using the ECU 50 as described above to change the upper connecting portion stiffness and the lower connecting portion stiffness, thereby changing the principal elastic axis height. As illustrated in FIG. 8, the principal elastic axis height has a tendency to decrease with a decrease in the upper connecting portion stiffness (the stiffness of the upper support 60) and to decrease with an increase in the lower connecting portion stiffness (the stiffness of the lower arm bushing 80).

When the principal elastic axis height is changed by changing the stiffness of the upper support 60 and the lower arm bushing 80 according to the braking state through the control of the ECU 50, the upper varying mechanism 31, and the lower varying mechanism 32 of this embodiment, the upper connecting portion stiffness and the lower connecting portion stiffness are controlled so that a front-back force compliance corresponding to the displacement amount of the spindle position when a front-back force is applied to the spindle position is maintained constant. FIG. 9 illustrates an example of a combination of the front-back stiffness (the upper connecting portion stiffness) of the upper support 60 and the front-back stiffness (the lower connecting portion stiffness) of the lower arm bushing 80 in which the front-back force compliance at the spindle position is constant. The front-back force compliance is changed according to the front-back stiffness of the upper support 60 and the front-back stiffness of the lower arm bushing 80. In FIG. 9, the solid line L indicates an assembly of combinations of the front-back stiffness of the upper support 60 and the front-back stiffness of the lower arm bushing 80 in which the front-back force compliance is constant at a predetermined value. Accordingly, the vehicle suspension device 1 can suppress an influence on harshness characteristics.

On the basis of the above description, the ECU 50 of this embodiment controls the upper varying mechanism 31 and the lower varying mechanism 32 at the time of smooth-braking of the vehicle 2 to perform the control which causes the upper connecting portion stiffness to be relatively decreased and causes the lower connecting portion stiffness to be relatively increased compared to at the time of non-braking of the vehicle 2. Accordingly, as illustrated in FIG. 8, in the vehicle suspension device 1, the principal elastic axis height changes from an operation point P1 which represents the principal elastic axis height at the time of non-braking of the vehicle 2 to an operation point P2 which represents the principal elastic axis height at the time of smooth-braking, thereby reducing the principal elastic axis height.

In this case, the ECU 50 changes the upper connecting portion stiffness and the lower connecting portion stiffness so that the front-back force compliance of the spindle 19 at the time of braking of the vehicle 2, here, at the time of smooth-braking thereof is equal to the front-back force compliance of the spindle 19 at the time of non-braking of the vehicle 2. That is, as illustrated in FIG. 9, the front-back stiffness of the upper support 60 and the lower arm bushing 80 are controlled so that the combination of the front-back stiffness of the upper support 60 and the front-back stiffness of the lower arm bushing 80 at the operation point P1 and the combination of the front-back stiffness of the upper support 60 and the front-back stiffness of the lower arm bushing 80 at the operation point P2 are both positioned on the solid line L. Accordingly, the vehicle suspension device 1 can reduce the principal elastic axis height while maintaining the front-back force compliance in a constant level at the time of smooth-braking of the vehicle 2.

Moreover, the ECU 50 prohibits the control which causes the upper connecting portion stiffness to be relatively decreased and causes the lower connecting portion stiffness to be relatively increased at the time of sudden-braking during the braking of the vehicle 2. Accordingly, in the upper support 60, the front-back stiffness of the vehicle 2 is relatively increased at the time of sudden-braking of the vehicle 2 compared to at the time of smooth-braking thereof, and in the lower arm bushing 80, the front-back stiffness of the vehicle 2 is relatively decreased at the time of sudden-braking of the vehicle 2 compared to at the time of smooth-braking thereof. As a result, in the vehicle suspension device 1, the operation point P2 illustrated in FIGS. 8 and 9 returns to the operation point P1.

As the ECU 50 controls the upper varying mechanism 31 and the lower varying mechanism 32, the vehicle suspension device 1 configured as described above achieves a state in which the upper connecting portion stiffness is relatively high and the lower connecting portion stiffness is relatively low in the normal use range such as at the time of non-braking of the vehicle 2 (see the operation point P1 of FIGS. 8 and 9). Accordingly, in the vehicle suspension device 1, the principal elastic axis height of the suspension 5 is relatively high in the normal use range such as at the time of non-braking of the vehicle 2, thereby securing driving stability.

Moreover, in the vehicle suspension device 1, in the smooth-braking range such as at the time of smooth-braking of the vehicle 2, when the braking torque is added, the ECU 50 controls the upper varying mechanism 31 and the lower varying mechanism 32 as described above so that the upper connecting portion stiffness is relatively decreased and the lower connecting portion stiffness is relatively increased (see the operation point P2 in FIG. 8), thereby changing the geometry of the suspension 5. At this time, in the vehicle suspension device 1, the front-back stiffness of the upper support 60 and the lower arm bushing 80 are changed while the front-back force compliance of the spindle 19 is substantially constant (see the operation point P2 of FIG. 9). Accordingly, in the vehicle suspension device 1, for example, not only the principal elastic axis height is changed by simply increasing the lower connecting portion stiffness at the time of smooth-braking, but also the upper connecting portion stiffness is decreased according to the increase in the lower connecting portion stiffness, thereby decreasing the principal elastic axis height while maintaining the front-back force compliance in a constant level. As a result, in the vehicle suspension device 1, brake vibration is reduced by decreasing the principal elastic axis height, and then the front-back force compliance is held to be constant, thereby suppressing an influence on harshness characteristics.

Furthermore, in the vehicle suspension device 1, in the sudden-braking range such as at the time of sudden-braking of the vehicle 2 at which the braking force of the vehicle 2 is relatively increased, the ECU 50 prohibits the control which causes the upper connecting portion stiffness to be relatively decreased and causes the lower connecting portion stiffness to be relatively increased such that the upper connecting portion stiffness is relatively increased and the lower connecting portion stiffness is relatively decreased, and thus both the stiffness return to values equal to those in the normal use range (see the operation point P2 of FIGS. 8 and 9). Accordingly, the vehicle suspension device 1 increases the principal elastic axis height at the time of sudden-braking of the vehicle 2 at which an influence on brake vibration or harshness characteristics and the like may not be considered, thereby enhancing driving stability.

Next, an example of the control by the ECU 50 will be described with reference to the flowchart of FIG. 10. The control routine is repeatedly performed in every control cycle of several milliseconds to tens of milliseconds.

First, the ECU 50 determines whether or not the braking operation by the driver is performed on the basis of the detection result by the brake sensor 51 and the like (ST1).

When it is determined that the braking operation by the driver is performed (Yes in ST1), the ECU 50 determines whether or not the vehicle 2 undergoes the smooth-braking on the basis of the detection result by each of the wheel speed sensors 52 (ST2) and the like. The ECU 50 can determine whether or not the vehicle 2 undergoes the smooth-braking on the basis of whether or not the braking force (or the deceleration) of the vehicle 2 which is estimated on the basis of the wheel speed of each of the wheels 3 detected by each of the wheel speed sensors 52 and the change rate thereof is equal to or smaller than a predetermined value (for example, a value corresponding to 0.2 G) set in advance. In addition, the ECU 50 may detect the braking force (or the deceleration) of the vehicle 2 on the basis of various sensors and methods without being limited to the above description.

When it is determined that the vehicle 2 undergoes the smooth-braking (Yes in ST2), the ECU 50 decreases the stiffness of the upper support 60 and increases the stiffness of the lower arm bushing 80 by controlling the upper varying mechanism 31 and the lower varying mechanism 32 such that the upper connecting portion stiffness is relatively decreased and the lower connecting portion stiffness is relatively increased (ST3). Then, the ECU 50 ends the current control cycle and proceeds to the subsequent control cycle.

When it is determined that the braking operation by the driver is not performed in ST1 (No in ST1), and when it is determined that the vehicle 2 does not undergo the smooth-braking (No in ST2), the ECU 50 increases the stiffness of the upper support 60 and decreases the stiffness of the lower arm bushing 80 by controlling the upper varying mechanism 31 and the lower varying mechanism 32 such that the upper connecting portion stiffness is relatively increased and the lower connecting portion stiffness is relatively decreased (ST4). Then, the ECU 50 ends the current control cycle and proceeds to the subsequent control cycle.

The vehicle suspension device 1 according to the embodiment described above includes the suspension 5, the varying device 30, and the ECU 50. The suspension 5 supports the wheels 3 of the vehicle 2 to the vehicle body 4 of the corresponding vehicle 2. The varying device 30 allows the upper connecting portion stiffness which is the stiffness between the vertically upper portion of the suspension 5 and the vehicle body 4 and the lower connecting portion stiffness which is the stiffness between the vertically lower portion of the suspension 5 and the vehicle body 4 to vary. The ECU 50 controls the varying device 30 at the time of braking of the vehicle 2 to perform the control which causes the upper connecting portion stiffness to be relatively decreased and causes the lower connecting portion stiffness to be relatively increased compared to at the time of non-braking of the vehicle 2.

Therefore, in the vehicle suspension device 1, the upper connecting portion stiffness (the front-back stiffness of the upper support 60) is decreased at the time of braking of the vehicle 2 compared to at the time of non-braking, the lower connecting portion stiffness (the front-back stiffness of the lower arm bushing 80) is increased, thereby decreasing the principal elastic axis height of the suspension 5 while holding a change in the front-back force compliance at a low level. As a result, the vehicle suspension device 1 achieves both driving stability enhancement and a reduction in brake vibration while suppressing a feeling of strangeness of the driver due to a change in harshness characteristics, thereby appropriately reducing unsprung vibration.

In the above description, the ECU 50 prohibits the control which causes the upper connecting portion stiffness to be relatively decreased and causes the lower connecting portion stiffness to be relatively increased at the time of sudden-braking of the vehicle 2, and may perform this control even at the time of sudden-braking of the vehicle 2 without being limited thereto.

[Second Embodiment]

Figure 11:
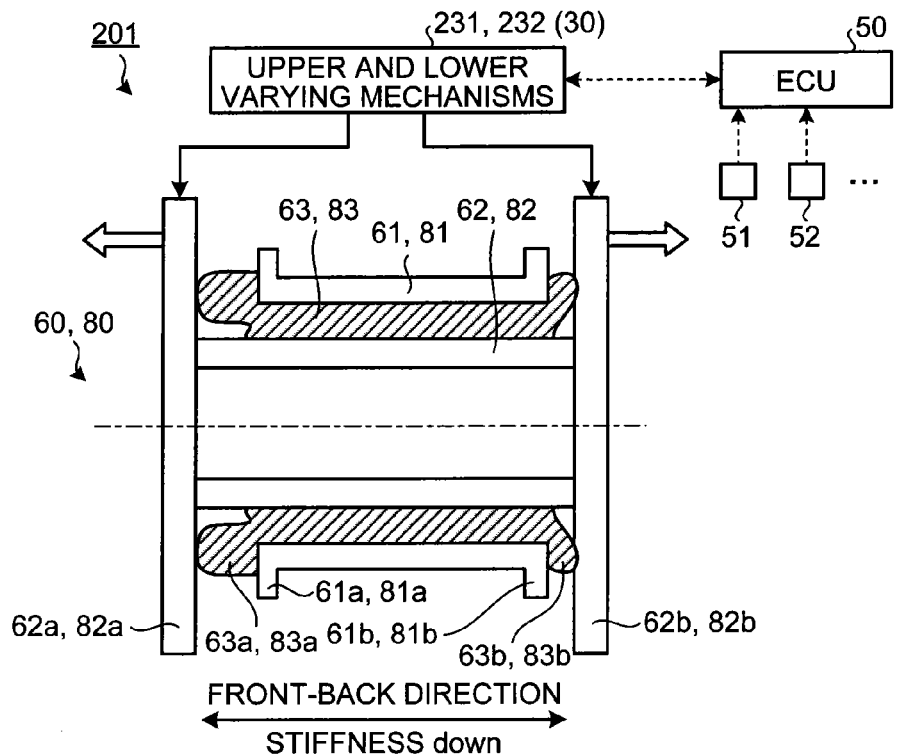
FIG. 11 is a schematic view illustrating the schematic configuration of a vehicle suspension device according to a second embodiment.
Figure 12:
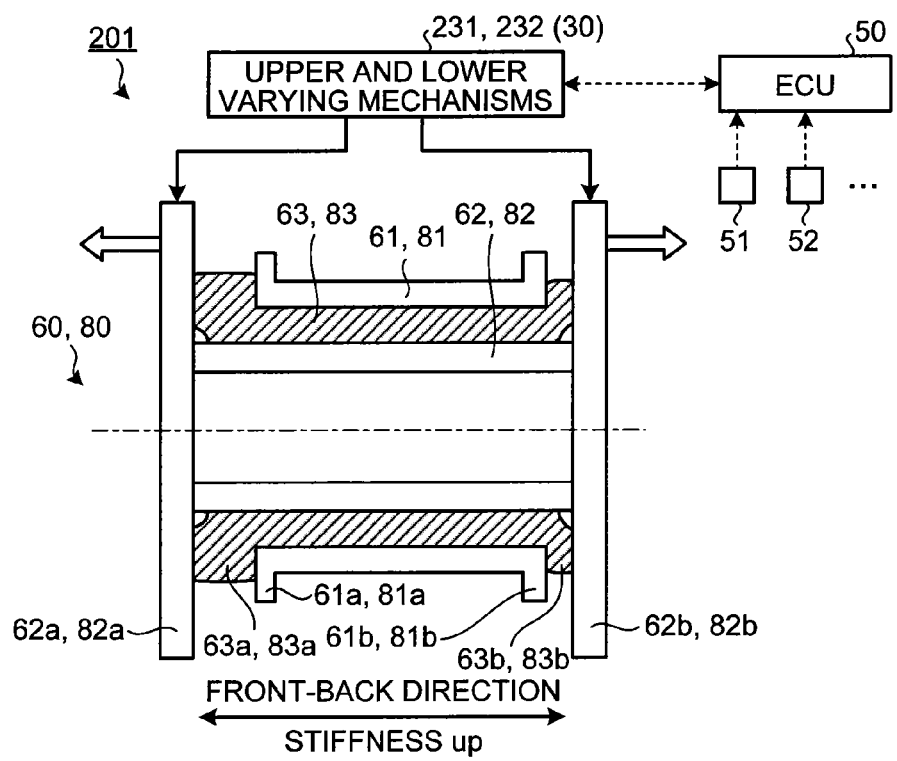
FIG. 12 is a schematic view illustrating an operation of the vehicle suspension device.
Figure 13:
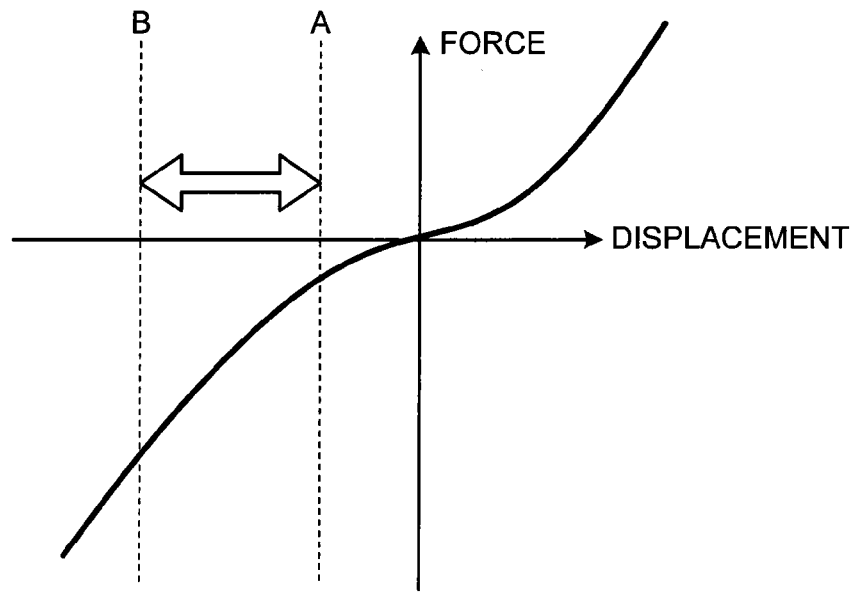
FIG. 13 is a diagram illustrating an example of the relation between the displacement and the force of the upper support and the lower arm bushing.
Figure 14:
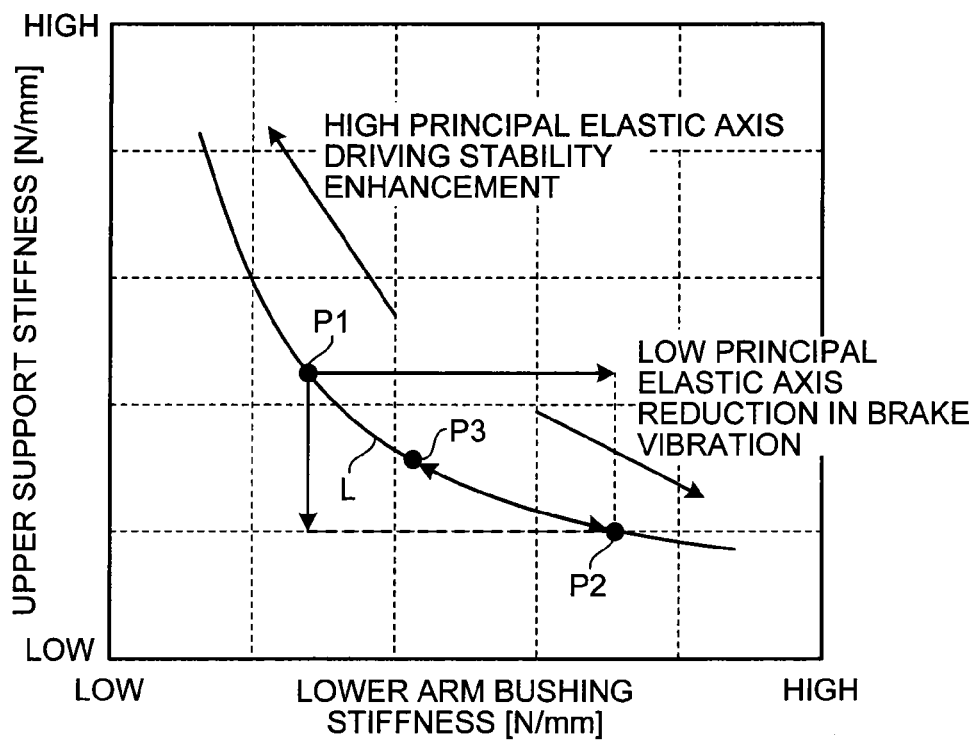
FIG. 14 is a diagram illustrating an example of a control map of the vehicle suspension device.
Figure 15:
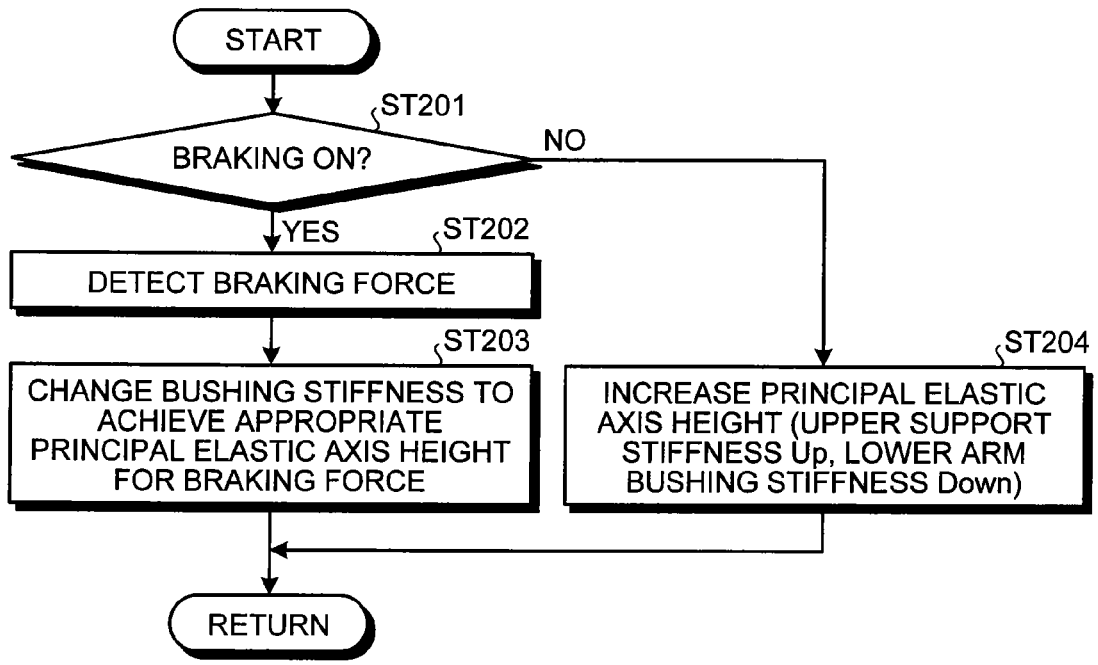
FIG. 15 is a flowchart illustrating an example of control by the ECU of the vehicle suspension device.
Figure 16:
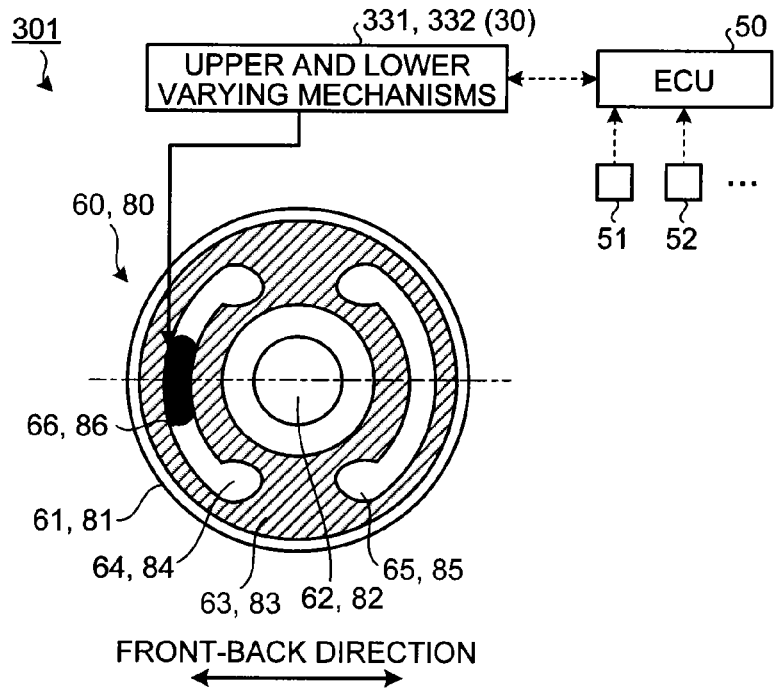
FIG. 16 is a schematic view illustrating the schematic configuration of a vehicle suspension device according to a modified example.

FIG. 11 is a schematic view illustrating the schematic configuration of a vehicle suspension device according to a second embodiment. FIG. 12 is a schematic view illustrating an operation of the vehicle suspension device. FIG. 13 is a diagram illustrating an example of the relation between the displacement and the force of the upper support and the lower arm bushing. FIG. 14 is a diagram illustrating an example of a control map of the vehicle suspension device. FIG. 15 is a flowchart illustrating an example of control by the ECU of the vehicle suspension device. FIG. 16 is a schematic view illustrating the schematic configuration of a vehicle suspension device according to a modified example. The vehicle suspension device according to the second embodiment is different from that of the first embodiment in control contents by a control device. The repeated description of configurations, actions, and effects which are common to the above-described embodiment will not be provided as much as possible.

A vehicle suspension device 201 of this embodiment illustrated in FIGS. 11 and 12 is configured so that the varying device 30 includes an upper varying mechanism 231 and a lower varying mechanism 232 instead of the upper varying mechanism 31 and the lower varying mechanism 32 of the first embodiment (see FIG. 1). The upper support 60 and the lower arm bushing 80 have substantially the same configuration, and the upper varying mechanism 231 and the lower varying mechanism 232 have substantially the same configuration. Therefore, FIGS. 11 and 12 collectively illustrate both the configurations. In the following description, the common configuration of the upper support 60 and the lower arm bushing 80 and the common configuration of the upper varying mechanism 231 and the lower varying mechanism 232 will be described to be common as much as possible.

The upper varying mechanism 231 and the lower varying mechanism 232 are configured to linearly change the stiffness of the upper support 60 and the stiffness of the lower arm bushing 80 respectively between a relatively great value and a relatively small value. FIGS. 11 and 12 illustrate the configurations of cases where the center axis lines of the cylindrical members of the upper support 60 and the lower arm bushing 80 are disposed along the front-back direction of the vehicle 2.

The upper support 60 is configured to include an outer cylinder 61, an inner cylinder 62, an elastic body 63, and the like, and the lower arm bushing 80 is configured to include an outer cylinder 81, an inner cylinder 82, an elastic body 83, and the like. The outer cylinders 61 and 81 and the inner cylinders 62 and 82 are cylindrical members that extend along the front-back direction of the vehicle body 4. The inner cylinders 62 and 82 are respectively inserted into the outer cylinders 61 and 81. Any one of the outer cylinder 61 and the inner cylinder 62 is provided on the piston rod 14 side and the other is provided on the vehicle body 4 side. Here, for example, the outer cylinder 61 is provided to a bracket on the vehicle body 4 side, and the inner cylinder 62 is provided on the piston rod 14 side. Any one of the outer cylinder 81 and the inner cylinder 82 is provided on the lower arm 12 side and the other is provided on the vehicle body 4 side. Here, for example, the outer cylinder 81 is provided to a bracket on the lower arm 12 side, and the inner cylinder 82 is provided on the vehicle body 4 side. The elastic bodies 63 and 83 are made of an elastomer such as rubber and are provided in a cylindrical shape so as to be respectively intervened between the outer cylinders 61 and 81 and the inner cylinders 62 and 82 in the radial direction. That is, the elastic bodies 63 and 83 are respectively disposed on the inner circumferential sides of the outer cylinders 61 and 81 and on the outer circumferential sides of the inner cylinders 62 and 82. In the upper support 60 and the lower arm bushing 80, the outer cylinders 61 and 81 and the inner cylinders 62 and 82 are relatively displaced along the axial direction (the front-back direction) at the time of braking.

In addition, in the upper support 60 and the lower arm bushing 80, protruding edge portions 61a, 81a, 61b, and 81b having an annular shape are respectively provided on both front-back end surfaces of the outer cylinders 61 and 81, and stopper portions 62a, 82a, 62b, and 82b having a disk shape are respectively provided on both front-back end surfaces of the inner cylinders 62 and 82. Here, the stopper portions 62a, 82a, 62b, and 82b are configured to be movable relative to the inner cylinders 62 and 82 along the front-back direction. Furthermore, in the upper support 60 and the lower arm bushing 80, protruding edge portions 63a, 83a, 63b, and 83b having an annular shape are respectively provided on both front-back end surfaces of the elastic bodies 63 and 83. In the upper support 60 and the lower arm bushing 80, the outer cylinders 61 and 81, the inner cylinders 62 and 82, and the elastic bodies 63 and 83 may be assembled in the following positional relation. That is, in the upper support 60 and the lower arm bushing 80, the stopper portions 62a and 82a and the protruding edge portions 61a and 81a respectively oppose each other at predetermined intervals in the front-back direction, and the stopper portions 62b and 82b and the protruding edge portions 61b and 81b respectively oppose each other at predetermined intervals. In the upper support 60 and the lower arm bushing 80, the protruding edge portions 63a and 83a are respectively positioned between the stopper portions 62a and 82a and the protruding edge portions 61a and 81a, and the protruding edge portions 63b and 83b are respectively positioned between the stopper portions 62b and 83b and the protruding edge portions 61b and 81b. In the upper support 60 and the lower arm bushing 80, by controlling the intervals between the stopper portions 62a and 82a and the protruding edge portions 61a and 81a, the intervals between the stopper portions 62b and 82b and the protruding edge portions 61b and 81b, and the like, the crushing amounts of the protruding edge portions 63a, 83a, 63b, and 83b are adjusted, and the bushing stiffness use ranges and bushing characteristics are adjusted.

The upper varying mechanism 231 and the lower varying mechanism 232 are configured to include motors and the like to move the stopper portions 62a, 82a, 62b, and 82b along the front-back direction. The upper varying mechanism 231 and the lower varying mechanism 232 move the stopper portions 62a, 82a, 62b, and 82b along the front-back direction by power generated by the motor. Accordingly, the upper varying mechanism 231 and the lower varying mechanism 232 allow the intervals between the stopper portions 62a and 82a and the protruding edge portions 61a and 81a and the intervals between the stopper portions 62b and 82b and the protruding edge portions 61b and 81B to vary, and thus can change the crushing amounts of the protruding edge portions 63a, 83a, 63b, and 83b. Therefore, as illustrated in FIG. 13, the upper varying mechanism 231 and the lower varying mechanism 232 can linearly change the stiffness of the upper support 60 and the stiffness of the lower arm bushing 80 from A to B, and furthermore, can linearly change the upper connecting portion stiffness and the lower connecting portion stiffness between a relatively great value and a relatively small value.

For example, as illustrated in FIG. 11, the upper varying mechanism 231 and the lower varying mechanism 232 relatively increase the intervals between the stopper portions 62a and 82a and the protruding edge portions 61a and 81a and the intervals between the stopper portions 62b and 82b and the protruding edge portions 61b and 81B to decrease the crushing amounts of the protruding edge portions 63a, 83a, 63b, and 83b such that the upper connecting portion stiffness and the lower connecting portion stiffness can be relatively decreased. On the other hand, for example, as illustrated in FIG. 12, the upper varying mechanism 231 and the lower varying mechanism 232 relatively decrease the intervals between the stopper portions 62a and 82a and the protruding edge portions 61a and 81a and the intervals between the stopper portions 62b and 82b and the protruding edge portions 61b and 81B to increase the crushing amounts of the protruding edge portions 63a, 83a, 63b, and 83b such that the upper connecting portion stiffness and the lower connecting portion stiffness can be relatively increased.

The ECU 50 controls the upper varying mechanism 231 and the lower varying mechanism 232 of the varying device 30 according to the braking state of the vehicle 2 to control the upper connecting portion stiffness and the lower connecting portion stiffness to vary. The ECU 50 of this embodiment controls the upper varying mechanism 231 and the lower varying mechanism 232 on the basis of the braking force (or the deceleration of the vehicle 2) of the vehicle 2 to linearly change the upper connecting portion stiffness and the lower connecting portion stiffness. Typically, the ECU 50 controls the upper varying mechanism 231 and the lower varying mechanism 232 according to the change in the braking force (or the deceleration of the vehicle 2) of the vehicle 2 to continuously change the upper connecting portion stiffness and the lower connecting portion stiffness.

Specifically, the ECU 50 controls the upper varying mechanism 231 and the lower varying mechanism 232 at the time of braking of the vehicle to perform the control which causes the upper connecting portion stiffness to be relatively decreased and causes the lower connecting portion stiffness to be relatively increased compared to at the time of non-braking of the vehicle 2. Here, the ECU 50 controls the upper varying mechanism 31 and the lower varying mechanism 32 at the time of smooth-braking during the braking of the vehicle 2 to perform the control which causes the upper connecting portion stiffness to be relatively decreased and causes the lower connecting portion stiffness to be relatively increased compared to at the time of non-braking of the vehicle 2. On the other hand, the ECU 50 prohibits the control which causes the upper connecting portion stiffness to be relatively decreased and causes the lower connecting portion stiffness to be relatively increased at the time of sudden-braking during the braking of the vehicle 2, and thus causes the upper connecting portion stiffness to be relatively increased and causes the lower connecting portion stiffness to be relatively decreased compared to at the time of smooth-braking. Accordingly, for example, the vehicle suspension device 1 achieves both driving stability (straight line stability) and reduction in brake vibration while suppressing a feeling of strangeness of the driver due to a change in harshness characteristics, thereby appropriately reducing unsprung vibration.

Here, the ECU 50 controls the upper varying mechanism 231 and the lower varying mechanism 232 on the basis of, for example, the control map exemplified in FIG. 14 to change the upper connecting portion stiffness and the lower connecting portion stiffness according to the braking force of the vehicle 2. The control map exemplified in FIG. 14 is a map in which a combination of the upper connecting portion stiffness and the lower connecting portion stiffness in which the front-back force compliance at the spindle position is constant, and the braking force of the vehicle 2 are associated with each other. The control map exemplified in FIG. 14 is produced in advance according to actual vehicle evaluations and the like, and is stored in a storage unit of the ECU 50. The ECU 50 estimates the braking force (or the deceleration) of the vehicle 2 on the basis of the wheel speed of each of the wheels 3 detected by each of the wheel speed sensors 52 and the like, and calculates the upper connecting portion stiffness and the lower connecting portion stiffness corresponding to the estimated braking force on the basis of the control map exemplified in FIG. 14. The ECU 50 controls the upper varying mechanism 231 and the lower varying mechanism 232 to achieve the calculated upper connecting portion stiffness and lower connecting portion stiffness.

In this embodiment, the ECU 50 calculates the upper connecting portion stiffness and the lower connecting portion stiffness by using the control map exemplified in FIG. 14 in the description. However, this embodiment is not limited thereto. For example, the ECU 50 may calculate the upper connecting portion stiffness and the lower connecting portion stiffness on the basis of a mathematical model corresponding to the control map exemplified in FIG. 14.

As the ECU 50 controls the upper varying mechanism 231 and the lower varying mechanism 232, the vehicle suspension device 201 configured as described above achieves a state in which the upper connecting portion stiffness is relatively increased and the lower connecting portion stiffness is relatively decreased in the normal use range such as at the time of non-braking of the vehicle 2 (see the operation point P1 of FIG. 14). Accordingly, in the vehicle suspension device 1, the principal elastic axis height of the suspension 5 is relatively high in the normal use range such as at the time of non-braking of the vehicle 2, thereby securing driving stability.

Moreover, in the vehicle suspension device 201, in the smooth-braking range such as at the time of smooth-braking of the vehicle 2, when the braking torque is added, the ECU 50 controls the upper varying mechanism 231 and the lower varying mechanism 232 according to the braking force of the vehicle 2 so that the upper connecting portion stiffness is relatively decreased and the lower connecting portion stiffness is relatively increased (see the operation point P2 in FIG. 14) according to the braking force, thereby changing the geometry of the suspension 5. At this time, in the vehicle suspension device 201, the front-back stiffness of the upper support 60 and the lower arm bushing 80 are changed while the front-back force compliance of the spindle 19 is substantially constant (see the operation point P2 of FIG. 14). Accordingly, in the vehicle suspension device 201, for example, not only the principal elastic axis height is changed by simply increasing the lower connecting portion stiffness at the time of smooth-braking, but also the upper connecting portion stiffness is decreased according to the increase in the lower connecting portion stiffness, thereby decreasing the principal elastic axis height while maintaining the front-back force compliance in a constant level. As a result, in the vehicle suspension device 201, brake vibration is reduced by decreasing the principal elastic axis height, and then the front-back force compliance is held to be constant, thereby suppressing an influence on harshness characteristics.

Furthermore, in the vehicle suspension device 201, in the sudden-braking range such as at the time of sudden-braking of the vehicle 2 at which the braking force of the vehicle 2 is relatively increased, the ECU 50 controls the upper varying mechanism 231 and the lower varying mechanism 232 according to the braking force of the vehicle 2 so that the upper connecting portion stiffness is relatively increased and the lower connecting portion stiffness is relatively decreased according to the braking force (see an operation point P3 of FIG. 14). At this time, the vehicle suspension device 201 controls the upper connecting portion stiffness and the lower connecting portion stiffness to have values corresponding to the braking force of the vehicle 2. Accordingly, the vehicle suspension device 201 increases the principal elastic axis height at the time of sudden-braking of the vehicle 2 at which an influence on brake vibration and the like may not be considered, thereby enhancing driving stability. At this time, in the vehicle suspension device 1, since the upper connecting portion stiffness and the lower connecting portion stiffness are continuously changed and controlled according to the change in the braking force and the principal elastic axis height is controlled, both a reduction in brake vibration and driving stability can be achieved with higher accuracy according to the change in the braking force. In addition, in the vehicle suspension device 201, the principal elastic axis height can be controlled by maintaining the front-back force compliance in a constant level even at this time, and thus an influence on harshness characteristics can be suppressed.

Next, an example of the control by the ECU 50 will be described with reference to the flowchart of FIG. 15.

First, the ECU 50 determines whether or not the braking operation by the driver is performed on the basis of the detection result by the brake sensor 51 and the like (ST201).

When it is determined that the braking operation by the driver is performed (Yes in ST201), the ECU 50 detects the braking force (or the deceleration) of the vehicle 2 on the basis of the detection result by each of the wheel speed sensors 52 (ST202) and the like.

The ECU 50 changes the stiffness of the upper support 60 and the lower arm bushing 80 by controlling the upper varying mechanism 231 and the lower varying mechanism 232 to change the upper connecting portion stiffness and the lower connecting portion stiffness so that an appropriate principal elastic axis height for the braking force of the vehicle 2 detected in ST202 is achieved (ST203). Then, the ECU 50 ends the current control cycle and proceeds to the subsequent control cycle.

When it is determined that the braking operation by the driver is not performed in ST201 (No in ST201), the ECU 50 increases the stiffness of the upper support 60 and decreases the stiffness of the lower arm bushing 80 by controlling the upper varying mechanism 231 and the lower varying mechanism 232 such that the upper connecting portion stiffness is relatively increased and the lower connecting portion stiffness is relatively decreased (ST204). Then, the ECU 50 ends the current control cycle and proceeds to the subsequent control cycle.

In the vehicle suspension device 201 according to the embodiment described above, the upper connecting portion stiffness (the front-back stiffness of the upper support 60) is decreased at the time of smooth-braking of the vehicle 2 compared to at the time of non-braking and the lower connecting portion stiffness (the front-back stiffness of the lower arm bushing 80) is increased, thereby decreasing the principal elastic axis height of the suspension 5 while holding a change in the front-back force compliance at a low level. As a result, the vehicle suspension device 201 achieves both driving stability enhancement and a reduction in brake vibration while suppressing a feeling of strangeness of the driver due to a change in harshness characteristics, thereby appropriately reducing unsprung vibration.

In the vehicle suspension device 201, the ECU 50 changes the upper connecting portion stiffness and the lower connecting portion stiffness on the basis of the braking force of the vehicle 2. Therefore, the vehicle suspension device 201 can achieve both driving stability enhancement and a reduction in brake vibration with higher accuracy while suppressing a feeling of strangeness of the driver due to a change in harshness characteristics.

The vehicle suspension device according to the above-described embodiment of the present invention is not limited to the above-described embodiment and can be modified in various forms in a range described in the appended claims.

FIG. 16 illustrates the schematic view of the schematic configuration of a vehicle suspension device 301 according to the modified example. The vehicle suspension device 301 is configured so that the varying device 30 includes an upper varying mechanism 331 and a lower varying mechanism 332 instead of the upper varying mechanism 231 and the lower varying mechanism 232 of the second embodiment (see FIG. 11). The upper varying mechanism 331 and the lower varying mechanism 332 are configured to linearly change the stiffness of the upper support 60 and the stiffness of the lower arm bushing 80 between a relatively great value and a relatively small value. FIG. 16 illustrates the configuration of case where the center axis lines of the cylindrical members of the upper support 60 and the lower arm bushing 80 are disposed to intersect with the front-back direction of the vehicle 2.

The upper support 60 is configured to include the outer cylinder 61, the inner cylinder 62, the elastic body 63, and the like, and the lower arm bushing 80 is configured to include the outer cylinder 81, the inner cylinder 82, the elastic body 83, and the like. Here, the outer cylinders 61 and 81 and the inner cylinders 62 and 82 are cylindrical members that extend along a direction intersecting the front-back direction of the vehicle body 4. The inner cylinders 62 and 82 are respectively inserted into the outer cylinders 61 and 81. The elastic bodies 63 and 83 are made of an elastomer such as rubber, and are respectively disposed on the inner circumferential sides of the outer cylinders 61 and 81 and on the outer circumferential sides of the inner cylinders 62 and 82. In the upper support 60 and the lower arm bushing 80, the outer cylinders 61 and 81 and the inner cylinders 62 and 82 are relatively displaced along the radial direction at the time of braking. In the upper support 60 and the lower arm bushing 80, the elastic bodies 63 and 83 are respectively provided with pairs of recesses (bored cavity parts) 64 and 84 and pairs of recesses 65 and 85.

The upper varying mechanism 331 and the lower varying mechanism 332 are configured to include insertion members 66 and 86 provided in the recesses 64 and 84. The insertion members 66 and 86 are formed by members and shapes which can be changed in size. In the upper support 60 and the lower arm bushing 80, the ECU 50 adjusts the sizes and the like of the insertion members 66 and 86 by controlling the upper varying mechanism 331 and the lower varying mechanism 332, and thus the bushing stiffness use ranges and bushing characteristics are adjusted. Therefore, the upper varying mechanism 331 and the lower varying mechanism 332 can linearly change the sizes of the insertion members 66 and 86 to linearly change the stiffness of the upper support 60 and the stiffness of the lower arm bushing 80, respectively. Furthermore, the upper connecting portion stiffness and the lower connecting portion stiffness can be linearly changed between a relatively great value and a relatively small value.

Even in this case, the vehicle suspension device 301 can achieve both driving stability enhancement and a reduction in brake vibration with higher accuracy while suppressing a feeling of strangeness of the driver due to a change in harshness characteristics.

In addition, the ECU 50 may have a configuration in which driving stability is enhanced by causing the upper connecting portion stiffness to be relatively increased and causing the lower connecting portion stiffness to be relatively decreased at the time of sudden-braking at which the absolute value of the braking force of the vehicle 2 is equal to or greater than a predetermined value set in advance compared to at the time of non-braking of the vehicle 2.

In addition, the suspension device main body described above is not limited to the above-described configuration and, for example, may have a configuration in which the upper arm 11 is not provided and the vertically lower end portion of the cylinder 15 is connected to the upper end portion of the knuckle 13 via a joint portion such as a ball joint.

In the above description, the control device of the vehicle suspension device is described as the ECU which controls each part of the vehicle, but without being limited thereto, for example, the control device of the vehicle suspension device may be configured separately from the ECU so as to transmit and receive information such as detection signals, drive signals and control commands with the ECU.

In addition, the varying device described above is not limited to the above-described configuration.

REFERENCE SIGNS LIST 1, 201, 301 VEHICLE SUSPENSION DEVICE
3 WHEEL
4 VEHICLE BODY
5 SUSPENSION (SUSPENSION DEVICE MAIN BODY)
6 UPPER CONNECTING PORTION
7 INTERMEDIATE CONNECTING PORTION
8 LOWER CONNECTING PORTION
9 COIL SPRING
10 SHOCK ABSORBER
11 UPPER ARM
12 LOWER ARM
13 KNUCKLE
14 PISTON ROD
15 CYLINDER
16, 17, 18 JOINT PORTION
19 SPINDLE
30 VARYING DEVICE
31, 231, 331 UPPER VARYING MECHANISM
32, 232, 233 LOWER VARYING MECHANISM
50 ECU (CONTROL DEVICE)
60 UPPER SUPPORT
70 UPPER ARM BUSHING
80 LOWER ARM BUSHING

The invention claimed is:

1. A vehicle suspension device comprising:
a suspension device main body configured to support a wheel of a vehicle to a vehicle body of the vehicle;
a varying device configured to cause an upper connecting portion stiffness and a lower connecting portion stiffness to be variable, the upper connecting portion stiffness being a stiffness between a vertically upper portion of the suspension device main body and the vehicle body, and the lower connecting portion stiffness being a stiffness between a vertically lower portion of the suspension device main body and the vehicle body; and
a control device configured to control the varying device at a time of braking of the vehicle to perform control which causes the upper connecting portion stiffness to be relatively decreased and causes the lower connecting portion stiffness to be relatively increased, compared to at a time of non-braking of the vehicle,
wherein the control device changes the upper connecting portion stiffness and the lower connecting portion stiffness so that a front-back force compliance of a spindle of the wheel at the time of braking of the vehicle is equal to a front-back force compliance of the spindle at the time of non-braking of the vehicle.

2. The vehicle suspension device according to claim 1, wherein
the varying device causes at least the upper connecting portion stiffness in a front-back direction of the vehicle and the lower connecting portion stiffness in the front-back direction of the vehicle to be variable.

3. The vehicle suspension device according to claim 1, wherein
the control device prohibits the control which causes the upper connecting portion stiffness to be relatively decreased and causes the lower connecting portion stiffness to be relatively increased in a case where an absolute value of a braking force of the vehicle is equal to or greater than a predetermined value set in advance.

4. The vehicle suspension device according to claim 1, wherein
the control device continuously changes the upper connecting portion stiffness and the lower connecting portion stiffness according to a change in the braking force of the vehicle.

5. The vehicle suspension device according to claim 1, wherein
the control device causes the upper connecting portion stiffness to be relatively increased and the lower connecting portion stiffness to be relatively decreased at a time of sudden-braking at which the absolute value of the braking force of the vehicle is equal to or greater than a predetermined value set in advance, compared to at a time of smooth-braking at which the absolute value of the braking force of the vehicle is smaller than the predetermined value.

6. The vehicle suspension device according to claim 1, wherein
the control device causes the upper connecting portion stiffness to be relatively increased and causes the lower connecting portion stiffness to be relatively decreased at a time of sudden-braking at which the absolute value of the braking force of the vehicle is equal to or greater than a predetermined value set in advance, compared to at the time of non-braking of the vehicle.

7. The vehicle suspension device according to claim 2, wherein
the control device prohibits the control which causes the upper connecting portion stiffness to be relatively decreased and causes the lower connecting portion stiffness to be relatively increased in a case where an absolute value of a braking force of the vehicle is equal to or greater than a predetermined value set in advance.

8. The vehicle suspension device according to claim 2, wherein
the control device continuously changes the upper connecting portion stiffness and the lower connecting portion stiffness according to a change in the braking force of the vehicle.

9. The vehicle suspension device according to claim 3, wherein
the control device continuously changes the upper connecting portion stiffness and the lower connecting portion stiffness according to a change in the braking force of the vehicle.

10. The vehicle suspension device according to claim 2, wherein
the control device causes the upper connecting portion stiffness to be relatively increased and the lower connecting portion stiffness to be relatively decreased at a time of sudden-braking at which the absolute value of the braking force of the vehicle is equal to or greater than a predetermined value set in advance, compared to at a time of smooth-braking at which the absolute value of the braking force of the vehicle is smaller than the predetermined value.

11. The vehicle suspension device according to claim 3, wherein
the control device causes the upper connecting portion stiffness to be relatively increased and the lower connecting portion stiffness to be relatively decreased at a time of sudden-braking at which the absolute value of the braking force of the vehicle is equal to or greater than the predetermined value set in advance, compared to at a time of smooth-braking at which the absolute value of the braking force of the vehicle is smaller than the predetermined value.

12. The vehicle suspension device according to claim 4, wherein
the control device causes the upper connecting portion stiffness to be relatively increased and the lower connecting portion stiffness to be relatively decreased at a time of sudden-braking at which the absolute value of the braking force of the vehicle is equal to or greater than a predetermined value set in advance, compared to at a time of smooth-braking at which the absolute value of the braking force of the vehicle is smaller than the predetermined value.

13. The vehicle suspension device according to claim 2, wherein
the control device causes the upper connecting portion stiffness to be relatively increased and causes the lower connecting portion stiffness to be relatively decreased at a time of sudden-braking at which the absolute value of the braking force of the vehicle is equal to or greater than a predetermined value set in advance, compared to at the time of non-braking of the vehicle.

14. The vehicle suspension device according to claim 3, wherein
the control device causes the upper connecting portion stiffness to be relatively increased and causes the lower connecting portion stiffness to be relatively decreased at a time of sudden-braking at which the absolute value of the braking force of the vehicle is equal to or greater than the predetermined value set in advance, compared to at the time of non-braking of the vehicle.

* * * * *